Figures 1, 2, 3, 4:
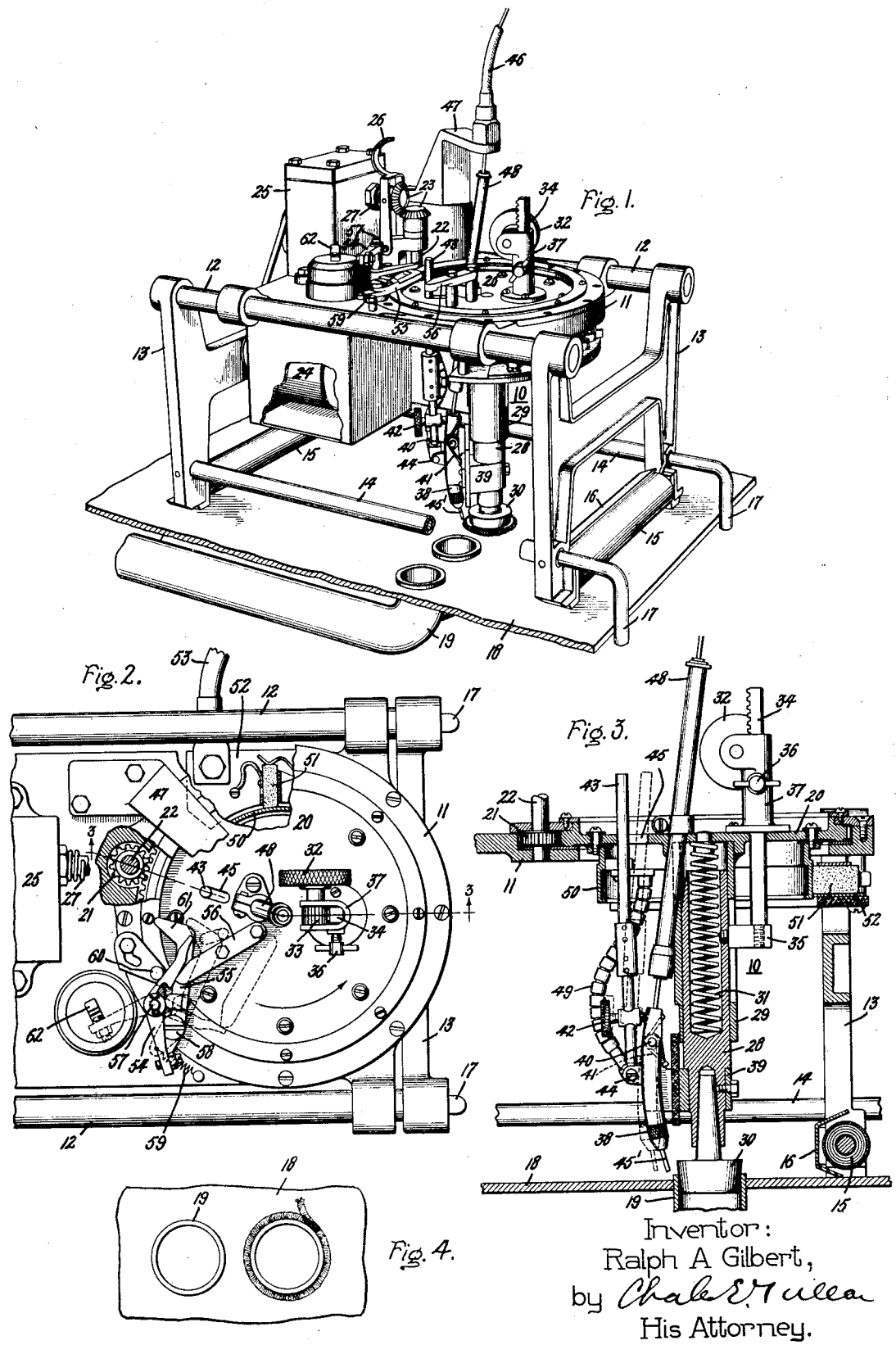

Feb. 27, 1934.  R. A. GILBERT  1,949,251
ARC WELDING
Filed Aug. 18, 1932

Inventor:
Ralph A. Gilbert,
by Chas. E. Mullan
His Attorney.

Patented Feb. 27, 1934

1,949,251

UNITED STATES PATENT OFFICE 1,949,251

ARC WELDING

Ralph A. Gilbert, Pittsfield, Mass., assignor to General Electric Company, a corporation of New York Application August 18, 1932. Serial No. 629,328

6 Claims. (Cl. 219—8)

My invention relates to welding and more particularly to improvements in machines for attaching tubes to tanks or tube sheets by arc welding.

It is an object of my invention to provide means for directing a welding arc in a predetermined closed path and thereafter swinging the arc away from this path after the weld has been lapped upon itself a predetermined amount before interrupting the welding arc.

By performing the welding operation, as stated above, the joint is tightly sealed by the overlapping weld and by swinging the arc away from the main weld before interrupting it, the arc crater is removed from the main weld. The resulting weld is leak proof and admirably suited for joining tubes to tube sheets or tanks in the manufacture of boilers, transformer tanks and the like.

My invention will be better understood from the following description taken in connection with the accompanying drawing, Fig. 1 of which illustrates a perspective view; Fig. 2 a top view, and Fig. 3 a side sectional view along the line 3—3 of Fig. 2. Fig. 4 illustrates the character of the weld produced by the machine illustrated in the preceding figures.

The welding machine illustrated in the drawing comprises a rotatable head 10 supported in a flanged ring 11 which is slidably mounted on guiding means 12 forming part of the frame of the machine. The guiding means 12 comprises two rods extending between end frames 13 which are also connected by cross-rods 14. The end frames 13 are provided at their work-engaging portions with electromagnets 15 by means of which the machine may be held in place on the work. The electromagnets 15 may be provided with shields 16 to protect them from spattered weld metal or the heat of the welding arc, or both. Suitable guiding means 17 may be provided for locating the machine relative to the work. As illustrated, this means comprises a plurality of bent rods which are adjustably connected to the framework of the machine and provided with portions which engage the work in order to predetermine the position of the machine relative thereto.

As has been noted above, the machine being described is particularly adapted for welding tubes in tube sheets and has been illustrated in the drawing in operative position relative to a tube sheet 18 into which tubes 19 are being welded.

The welding head 10 comprises a turn table 20 which is rotatably supported in the flanged ring 11. The periphery of this turntable is provided with gear teeth and the turntable, in fact, constitutes a spur gear of large diameter which is rotated by smaller gear 21 connected through a shaft 22 and bevel gears 23 to an electric motor 24 through a gear transmission included in the box 25. The connection between the bevel gears 23 may be interrupted by moving lever 26 and the gear connected thereto against the action of a spring 27 which normally holds these gears in engagement with one another.

A spindle 28 is attached through the agency of a sleeve 29 to the turntable 20. The spindle 28 is adapted to support at its lower end a centering tool 30, the shank of which is inserted in the spindle 28 and the head portion of which is inserted in the tube being welded to the tube sheet. The head of the centering tool during welding is stationary by reason of its being in engagement with the work and is rotatably supported on its shank which is inserted in the rotating spindle of the machine to accommodate the relative movement between the welding head and the work during welding. The spindle 28 is biased by means of a spring 31 toward the work but may be moved in a direction away from the work against this bias by the operation of a hand-wheel 32 which rotates a gear 33 meshing with a rack forming part of the rod 34, one end of which is attached through a stud 35 to spindle 28. The sleeve 29 in which the spindle 28 is supported is slotted to accommodate the movement of this stud. The spindle may be clamped in an adjusted position by means of a clamping screw 36 which acts upon rod 34 and holds it in adjusted position relative to its supporting member 37 which is attached to the turntable 20 of the welding head.

An electrode holder 38 is pivotally attached at 40 to a supporting collar 39 attached to the lower portion of spindle 28, and biased by a spring 41 so that the arcing terminal of the electrode supported therein is biased toward the axis of the spindle 28 to a position in proximity to the work. The electrode holder may be adjusted relatively to the spindle 28 by means of a screw 42 which is supported in a lever 43, one end of which is pivoted at 44 to holder 38, and the other end of which extends through a radial slot 45 in the turntable 20. The spring 41 associated with the electrode holder 38 acts through the adjusting screw 42 on lever 43 normally holding it in the position illustrated in the drawing.

The electrode holder may be adapted for fusible metallic electrodes or for carbon or other non-consuming electrodes. In the particular arrangement illustrated the holder 38 is in reality a nozzle through which the electrode 45′ is fed toward the work. The electrode may be fed from a source of supply by means such as shown in Patent No. 1,508,711, P. O. Noble, September 16, 1924, the flexible tube 46 of which is attached at 47 to the welding machine illustrated in the drawing. The electrode is fed from this tube through a conduit 48 which is supported in an inclined position in the turntable 20, so that the electrode is fed from a point substantially in line with the axis of the spindle out through an opening in the side of the spindle and thence to the curved nozzle 38 by means of which it is again directed toward the work at an acute angle to both the tube sheet and the tube inserted therein.

Current is supplied to the nozzle 38 through an insulated conductor 49, one end of which is attached to the nozzle and the other end of which is attached to a slip ring 50 supported on the under side of turntable 20. Current is supplied to slip ring 50 through brushes 51 which are supported on and electrically connected to a segment 52 to which welding current is supplied through a conductor 53 connected thereto. The nozzle 38, conduit 48, support 47, slip ring 50, upper portion of lever 43 and segment 52 are electrically insulated, as illustrated in the drawing from the other parts of the machine.

The tilting of lever 43 and thus the swinging of the nozzle 38 in a direction away from the weld between the tube and tube sheet prior to the interruption of the welding arc is accomplished by means of levers 54, 55 and 56. Lever 56 is rigidly attached to the turntable 20 and levers 54 and 55 are respectively pivoted at 57 and 58 to the annular ring 11 in which the turntable is supported. Levers 54 and 55 are provided with cams by means of which motion imparted to lever 54 is imparted to lever 55. These levers are held in the position illustrated with lever 54 in engagement with stop 60 attached to the flanged ring 11, through the action of a spring 59 attached to one end of lever 55 which is provided at its other end with a cam surface 61 by means of which lever 43 is operated.

In the drawing the levers are illustrated in the position they assume at the beginning of the welding operation. Before starting the welding operation after the machine is in the position illustrated relative to the work, gears 23 are disengaged by moving lever 26 and turntable 20 is moved in a clockwise direction until the levers assume the positions illustrated. Further movement in a clockwise direction is prevented by stop 60 and levers 54 and 56. The operator then initiates the welding operation by operating switch 62. This switch starts the rotary motion of the welding head and also initiates the welding operation. For example, it may be included in place of switch "20" in a control circuit such as illustrated in Fig. 8 of Patent No. 1,508,691, C. E. Glasser, September 16, 1928. Although the electrode feed motor shown in this patent is connected across the arc, it is to be understood that other arrangements may be employed in which a constant speed motor is connected to the electrode feeding mechanism through a suitable transmission by means of which the speed of electrode feed is varied in accordance with the condition of the welding arc. The motor "16" of the above Glasser patent corresponds in function to my motor 24 above referred to.

During welding the head rotates in a counterclockwise direction as indicated by the arrow in Fig. 2 of the drawing. Eventually lever 56 engages lever 54 and moves it until the various levers assume the positions illustrated in dotted lines. During movement of the levers 54 and 55 by lever 56, the cam portion 61 of lever 55 is thrown into the path of travel of the lever 43 which upon engagement therewith is moved toward the center of the turntable from its illustrated position to the dotted line position shown in the drawing. This causes the welding arc to swing out from the weld between the tube and the tube sheet in which the pipe is inserted. When lever 54 is moved into the position illustrated in dotted lines, it also operates switch 62 which interrupts the welding operation. The operation of this switch also deenergizes motor 24 by means of which the head 10 is rotated. The parts do not come to rest immediately but coast slightly beyond the positions illustrated in dotted lines which allows the several levers to assume their normal positions and when the head is again reset by a clockwise rotation these levers assume the positions illustrated in full lines in the drawing. It will be observed that the head 10 rotates the nozzle one and a fraction revolutions, so that the weld between the tube 19 and plate 18 is lapped upon itself a predetermined amount after which the arc is swung out and the welding operation ended at a point outside the weld, as illustrated in Fig. 4 of the drawing.

The twisting movement imparted to the electrode during the welding operation by the rotation of the head 10 causes no trouble. One reason for this is that while the nozzle makes one revolution the electrode feeds forward about 12 or 13 inches. Therefore, as the machine operates the twisted section of the electrode is consumed in the arc, and new electrode wire is continuously fed into the machine which in turn takes the twist and is consumed. It is thus not necessary for the feeding mechanism and the supply of welding material to be rotated along with the welding head, and this mechanism may be placed at a remote point and connected with the welding head through a flexible tube 46 such as has been illustrated in the drawing.

Although I have illustrated and described a particular embodiment of my invention, it is to be understood that my invention is not limited thereto.

What I claim as new and desire to secure by Letters Patent of the United States, is,—

1. Welding apparatus comprising means for directing a welding arc in a predetermined closed path, means for swinging the arc away from said path after the weld has been lapped upon itself a predetermined amount, and means for interrupting the welding arc after it has been swung away from said closed path.

2. Welding apparatus comprising a support, an electrode holder pivotally attached to said support and positioned relatively thereto to locate the arcing terminal of an electrode supported thereby in proximity to the work, means for rotating said support, and means for swinging said electrode holder about its pivot after said support has been rotated more than one revolution.

3. Welding apparatus comprising a spindle one end of which is adapted to support a centering tool which engages the work, an electrode holder pivotally attached to said spindle and positioned relatively thereto to locate the arcing terminal of an electrode supported thereby in proximity to the work, means for rotating said spindle, and means for swinging said electrode holder about its pivot after said spindle has been rotated more than one revolution.

4. Welding apparatus comprising a spindle, means for rotating said spindle, a nozzle pivotally attached to said spindle, means for directing an electrode through said spindle to said nozzle, means for supplying welding current to said nozzle, means for tilting said nozzle about its pivot, and means for operating said last-mentioned means after said nozzle has been rotated more than one revolution about the axis of said spindle.

5. Welding apparatus comprising a framework having longitudinal guiding means, a turntable, an annular support for said turntable slidably mounted on said guiding means, means for rotating said turntable, a spindle projecting toward the work from the center of said turntable, a nozzle pivotally attached to the side of said spindle, means for directing an electrode through said spindle to said nozzle, means for supplying welding current to said nozzle, means for tilting said nozzle about its pivot, and means for operating said last-mentioned means after said nozzle has been rotated a predetermined distance about the axis of said spindle.

6. Welding apparatus comprising a framework having longitudinal guiding means, a flanged ring slidably mounted on said guiding means, a turntable rotatably supported in said flanged ring, means for rotating said turntable, a spindle projecting from the center of said turntable adapted to support at its lower end a centering tool which engages the work, means for biasing said spindle toward the work, means for moving said spindle away from the work against the action of said biasing means, a nozzle pivotally attached to said spindle at a point near said centering tool, means for directing an electrode through said spindle to said curved nozzle from a point of supply substantially in line with the axis of said spindle, a slip ring, means for attaching said slip ring to said turntable, means for electrically connecting said slip ring to said nozzle, means for supplying welding current to said slip ring, means for tilting said nozzle about its pivot, means associated with said last-mentioned means for adjusting the inclination of said nozzle to said spindle, means for electrically insulating said tilting means, said slip ring and said nozzle from the other parts of said apparatus, and means for operating said tilting means after said nozzle has been rotated a predetermined distance about the axis of said spindle.

RALPH A. GILBERT.